Dec. 11, 1962 H. L. WHEELER, JR 3,067,982
POROUS WALL TURBINE BLADES AND METHOD OF MANUFACTURE
Filed Aug. 25, 1958 2 Sheets-Sheet 1

INVENTOR.
HARRY L. WHEELER JR.
BY Lyon & Lyon
ATTORNEYS

Dec. 11, 1962 H. L. WHEELER, JR 3,067,982
PORUS WALL TURBINE BLADES AND METHOD OF MANUFACTURE
Filed Aug. 25, 1958 2 Sheets-Sheet 2
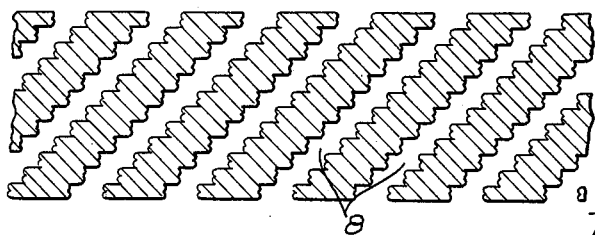
FIG. 9
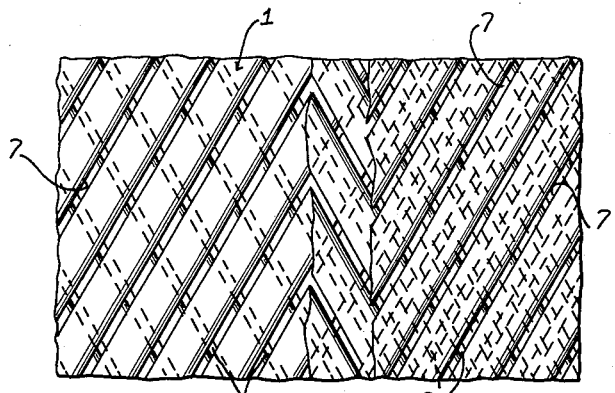
FIG. 10
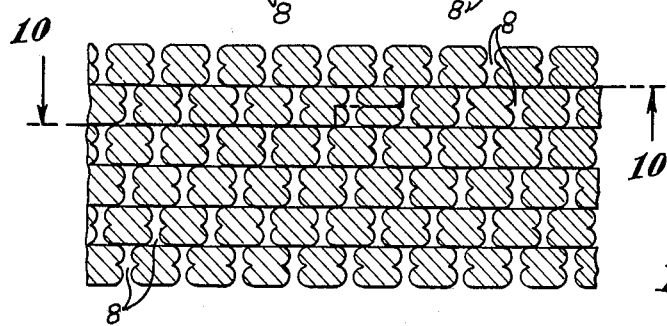
FIG. 11
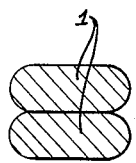 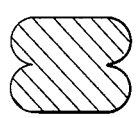 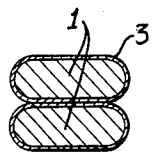 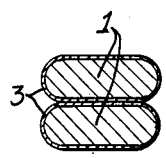
FIG. 12   FIG. 13   FIG. 14   FIG. 15
INVENTOR.
HARRY L. WHEELER, JR
BY
*Lyon + Lyon*
ATTORNEYS

United States Patent Office 3,067,982
Patented Dec. 11, 1962

3,067,982
POROUS WALL TURBINE BLADES AND METHOD
OF MANUFACTURE
Harry L. Wheeler, Jr., La Canada, Calif., assignor to
California Institute Research Foundation, Pasadena,
Calif., a corporation of California
Filed Aug. 25, 1958, Ser. No. 756,913
7 Claims. (Cl. 253—39.1)

This invention relates to porous wall turbine blades and is a continuation-in-part of my copending application Serial No. 335,670 filed February 9, 1953, for Porous Wall Construction and Method of Manufacture, now abandoned. Included in the objects of this invention are:

First, to provide a turbine blade having a porous wall wherein the pore spaces are accurately located, and wherein the porosity not only may be uniform or may vary in a predetermined manner, but also may vary in direction, that is, may be normal to the wall surface, or inclined, or tapered in their course through the wall or be labyrinth in nature, to meet design requirements.

Second, to provide a porous turbine blade and method of manufacture wherien wire is wound in a predetermined manner on a mandrel defining a figure of revolution, bonded at cross points, after which the wound wire figure is removed from the mandrel, resintered and reformed into the profile of a turbine blade.

Third, to provide a porous turbine blade and method of manufacture which may be formed with wires wrapped at low angles to increase its radial strength or at high angles to increase its axial strength.

Fourth, to provide a porous wall and method of manufacture which though primarily suitable for the manufacture of turbine blades may be utilized in the formation of other aerodynamic figures or portions thereof.

With the above and other objects in view as may appear hereinafter, reference is directed to the accompanying drawings in which.

Figure 5:
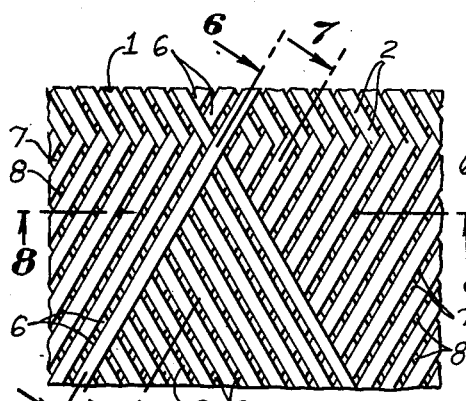
FIGURE 5 is a greatly exaggerated and substantially diagrammatical fragmentary plan view showing a typical pattern formed by two laminations.
Figure 6:
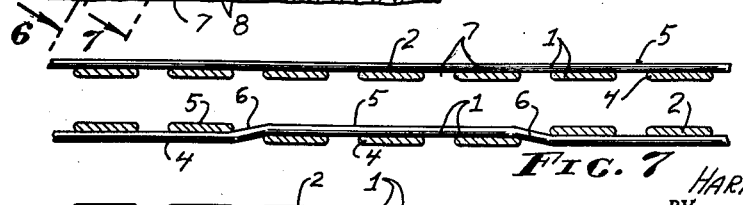
Figure 7:
Figure 8:

FIGURES 6, 7 and 8 are substantially diagrammatical sectional views thereof respectively through 6—6, 7—7 and 8—8 of FIGURE 5.

FIGURE 9 is a greatly exaggerated fragmentary and substantially diagrammatical sectional view of a completed wall of a turbine blade taken in plane corresponding to FIGURE 8.

FIGURE 10 is a greatly exaggerated fragmentary and substantially diagrammatical plan view of a turbine blade wall wherein the wires are wound to form labyrinth passages and showing successive layers removed as represented by the line 10—10 of FIGURE 11.

FIGURE 11 is a greatly exaggerated fragmentary and substantially diagrammatical sectional view thereof through 11—11 of FIGURE 10.

FIGURE 12 is a diagrammatical view showing wires of two laminations in juxtaposition before heating and bonding.

FIGURE 13 shows the wires of FIGURE 12 after being fused together.

FIGURE 14 is a diagrammatical view similar to FIGURE 12 showing coated or plated wires.

FIGURE 15 shows the wires of FIGURE 14 after the coating or plating has fused together.

In the exercise of this invention, one or more fine wires 1 are wound under tension on to a cylindrical mandrel not shown. By controlling the manner in which the wire 1 is wound on the mandrel and by controlling the cross section of the wire itself, a porous wall may be constructed, the porosity of which may be uniform, or, if desired, non-uniform, or graduated, but in any case the porosity is predictable to a close degree.

The wire 1 is wound on a mandrel capable of withstanding the bonding temperature of the material comprising the wire. Thus the mandrel may be formed of ceramic material or formed of metal and coated with a ceramic material or otherwise treated so that its surface will not bond with the wire. After the wire has been wound to form a plurality of laminations, the mandrel, with the wire thereon, is subjected to bonding temperatures causing the contacting surfaces of the laminations of wire to fuse together under the influence of pressure resulting from tension.

While the wire 1 may have a wide variety of cross sectional configurations such as circular, rectangular, or ellipsoidal cross section, it has been found that a relatively flat wire is advantageous; or in some cases the wire may be in the nature of a ribbon with a high width to thickness ratio. This may be accomplished by running the wire between rollers either prior to winding or in the course of winding the wire on the mandrel. The flat configuration provides a maximum area over which the successive laminations of wire are in pressure contact and thus insures an adequate area to be bonded when heated.

The cross section or area of the wire 1 varies with the intended use, that is, if the finished product is to be a turbine blade of small size, extremely fine wire may be used. If the finished product is to be an airfoil or portion thereof of large area, coarser wire may be used. The diameter of the mandrel selected varies accordingly. However, in any case extremely fine wire may be used. For example, wire flattened to one thousandth in thickness has been used.

It has been found feasible first to provide an initial bond, between crossed portions 2 of the wire, by heating the wire while on the mandrel, then remove the mandrel, then subject the porous wall formed by the wire to mechanical pressure, and then reheat and complete the bond. Also, the wire 1 may be wound in cylindrical form, then prebonded, then removed from the mandrel and slit lengthwise, then flattened into a sheet, and then passed between rollers, and then again heated to increase the bond.

Inasmuch as the wire is wound under high tension, high radial pressure is exerted between the wires at the points of crossing and the pressure is maintained in the completely wound structure while it is still on the mandrel. The initial bonding is accomplished by heating the wound wire while still on the mandrel and the pressure exerted by wire tension provides the required pressure for effecting a secure bond at the temperatures employed. After the structure is removed from the mandrel and compressed to a finer dimension, the portions of the wires adjacent the initial bond are deformed and the area of contact between the wires is extended or increased. Since the wire is plastically deformed and by reason of such deformation, pressure exists between the wire surfaces at the extended areas of contact and the final heating results in fusing the wires, by heat and the then existing pressure, to provide the required bond. During the compression of the porous wall after removal from the mandrel, the wires of the laminations are forced closer together, thus producing passages of even smaller dimensions than existed at the start of the rolling and permits construction of porous walls with extremely fine passageways therethrough and permits accurate control of the uniformity and porosity of the product.

Thus, the porosity is not only controlled by the initial spacing and dimension of the wires as wound but also by the degree of compression. If relatively light rolling pressure is exerted by the rollers, maximum porosity for a given initial wire spacing is obtained; whereas if a heavy rolling pressure is exerted the porosity is correspondingly reduced.

While the major rolling pressure is preferably applied after removal from the mandrel, an initial rolling operation may be performed after the porous wall structure is sintered but while the porous wall structure is still on the mandrel. This operation tends to free the porous wall structure from the mandrel. If a thin ceramic coating is utilized on the mandrel as a parting agent, it may be crushed by such initial rollings and thus further facilitate removal of the porous wall structure.

As has been indicated hereinbefore, the spacing between individual convolutions of wire and the relative position of the wires comprising succeeding convolutions makes possible the construction of a porous wall having precisely the selected porosity and resistance to flow; that is, with a given porosity the resistance to flow may be increased or decreased depending on the relation between succeeding laminations of the wire.

Whether a single wire or a multiplicity of wires are used, the winding pitch is such that the wires of succeeding layers cross at a substantial angle with a result that the resulting wall structure wil have favorable strength longitudinally as well as circumferentially.

If a single wire is used, it follows that many traverses of the wire 1 are required before the spaces between the initial convolutions of the wire may be filled. This, of course, results in crossing of the wires at the periodic points designated 2, along the figure of revolution as shown in FIGS. 5 and 7. Any increase in thickness at these points is eliminated after the initial heating and bonding of the wires by pressing or running the wall structure between rollers.

More specifically, in the course of filling in or completing one lamination designated 4 in FIGURES 5 through 8 by repeated traverses of the wire 1, a second lamination designated 5 is also completed, due to the fact that for each forward traverse of the wire there is a return traverse. Each lamination corresponds to a row of wires as shown in FIGURES 5 through 8; that is, the first lamination 4 corresponds to the bottom row in these figures and the second lamination 5 corresponds to the second row.

The cohelical sets of wire convolutions comprising, respectively, the sum of the forward traverses and the sum of the return traverses are not identical with the first and second laminations 4 and 5, particularly after the wall structure thus formed is compressed; that is, the portions of the wire comprising the forward cohelical set of convolutions overlie the return cohelical set of convolutions and are thus pressed into the second lamination 5; and similarly portions of the return cohelical set of convolutions are pressed into the first lamination 4. The depressing operation deforms each portion of the wire where it shifts from one to the other lamination as indicated by 6, resulting in increased bond adjacent these points after the final heating and bonding step. As the winding of the wire is continued, additional pairs of laminations are formed.

Figure 2:
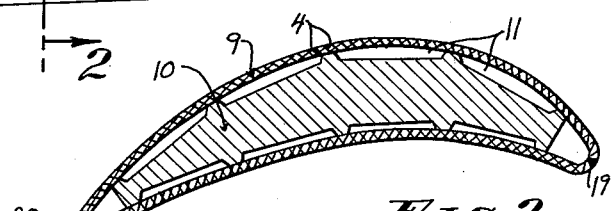
FIGURE 2 is an enlarged cross sectional view through 2—2 of FIGURE 1 with thickness of wrapped wire wall exaggerated and showing diagrammatically the general direction of the pore spaces.
Figure 4:
FIGURE 4 is an enlarged cross sectional view through 4—4 of FIGURE 1 with the thickness of the wrapped wire wall exaggerated and showing diagrammatically the general direction of the pore spaces.

As mentioned hereinbefore, the wire 1 may be wound on itself to produce a wide variety of porous conditions. Perhaps the simplest form involves winding the wire at a uniform rate back and forth over a rotating cylindrical mandrel. By controlling the relative rate of rotation and feed, the succeeding laminations of the wire may be stacked in such a way that continuous pores may be formed. Thus, as shown in FIGURE 5, the wire 1 may be wound to form channels or passages 7 parallel to each other and to the surfaces of the wall thus formed. If the wire is laid uniformly, the succeeding laminations form ports 8 extending in any preselected direction relative to the two surfaces of the resulting cylinder or other figure of revolution, as, for example, the passages 8 may extend in acute angular relation to the two surfaces as shown in FIGURES 2 and 9 or perpendicular to the surface as indicated in FIGURE 4. The angular orientation of the ports 8 is particularly desirable if the flow of fluid through the ports 8 is utilized for control of the boundary layer between an aerodynamic structure and the surrounding fluid.

The manner in which the wire may be fed on to the rotating mandrel may be so regulated that succeeding layers do not place the ports in alignment. Thus, if the succeeding pairs of laminations are staggered as shown in FIGURES 10 and 11, the ports 8 are not connected except through the channels 7. The result is that a multiplicity of labyrinth passages are formed, which, however, may be uniformly spaced and quite predictable in character. This type of construction is suitable for turbine blades or the like, in which it is desirable to effect sweat cooling.

The metal comprising the wire is determined by the use for which the porous wall is intended. Thus, steel, copper, titanium, molybdenum wires, as well as alloys, to mention only a few, may be employed to meet specific conditions. Still further as shown specifically in FIGURES 14 and 15, the wire may be plated or otherwise coated as indicated by 3. In this case, the bonding temperature need only be high enough to fuse the coating material. For example, a copper plated steel wire would thus be capable of being bonded or fused at a lower temperature than unplated steel wire.

It, of course, follows that in winding the wire back and forth across the mandrel, the pitch must change to zero and reverse at each end with the result that there is a "build-up" at the extremities of the figure of revolution. If the resulting decrease in porosity in these end regions is objectionable in the final production, these portions may be trimmed off after sintering. However, in many cases, these ends will be welded or otherwise secured to other members, and the lack of porosity and correspondingly increased density and strength is advantageous.

It is necessary, of course, that the ends of the porous wall figure wound on the mandrel remain in place and not shift axially. If the winding pitch angle is less than 20°, the frictional contact between the wire and the mandrel is sufficient to prevent axial shifting of the wire.

However, in winding the wire at pitch angles greater than 20° it is necessary to pass the wire as a chord across the end of the mandrel. The location of the chord path is such that the angle formed by the subtended arc has a value equal to twice the pitch angle. By so winding the ends of the figure forming the porous wall, the pitch angle may be 60° or, if desired, even more. A 45° pitch angle will give the resulting porous wall figure equal strength in a longitudinal and a circumferential direction. If greater than 45° pitch angle is used, the strength in a longitudinal direction is made greater than in a circumferential direction. Thus the strength characteristics of the porous wall may be adjusted to meet particular needs.

While it is not necessary to wind over the end of the mandrel or over a shoulder thereon if the pitch angle is less than 20°, it has been found that the uniformity is improved if this is done, particularly in the winding of large diameter figures.

Figure 1:
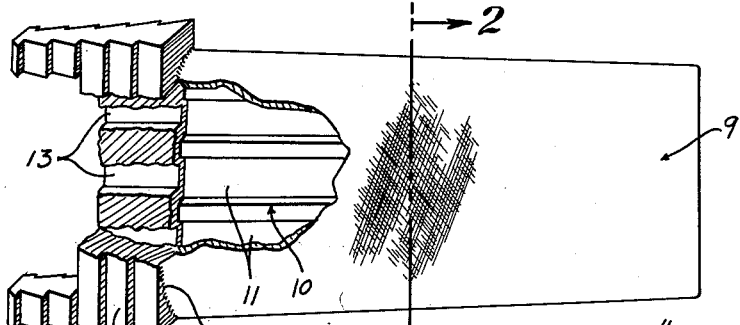
FIGURE 1 is a perspective view of turbine blade with wire wound with low pitch angle and portions broken away and in section to show internal construction.

In order to form a turbine blade such as shown in FIGURES 1 through 4, particularly the type wherein the cross section diminishes from the root to the extremity of the blade, the mandrel may be tapered so as to have a periphery which varies in accordance with the change in periphery of the turbine blade. After the conical or tapered wall structure is formed on the mandrel, removed therefrom and the wires are properly bonded together, the wall structure is flattened and formed into the configuration of a turbine blade. If the wire has been wound with a low pitch angle, a turbine blade shell 9 is formed as shown in FIGURES 1 and 2 which has a greater strength peripherally than it has axially. Consequently a supporting core or inner strut 10 is required. The strut 10 is shaped to conform to the interior of the shell and is provided with longitudinal grooves or channels 11. The extended end of the shell 9 is welded or otherwise bonded to the extremity of the strut 10. As indicated previously, the build up at the extremities of the porous wall as wound on the mandrel may serve advantageously in the welding of the extremity of the strut and turbine blade.

The root end of the strut 10 is joined to or formed integral with a step keyed root member 12 which is adapted to be joined in a conventional manner to a turbine wheel not shown. Ports 13 extend through the root member to the channels 11. The root end of the shell 9 is welded or otherwise bonded at the juncture of the root member and strut as indicated by 14. With this construction the strut carries the radial loads.

Figure 3:
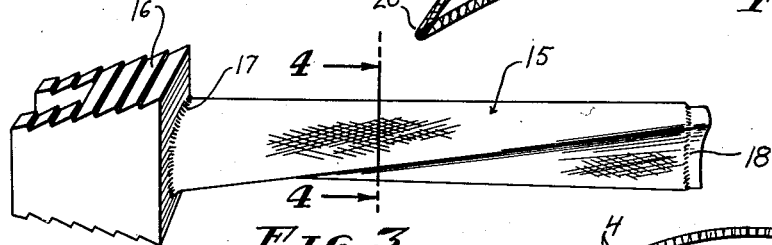
FIGURE 3 is a perspective view of a turbine blade with wire wound with high pitch angle.

In the construction shown in FIGURES 3 and 4 a turbine blade shell 15 is formed of a cylindrical or tapered blank which has been wound with a high pitch angle as hereinbefore described so as to have maximum strength in a radial direction. In this case the shell 15 is welded or otherwise joined directly to a root member 16 as indicated by 17. The extended end is sealed closed as indicated by 18.

When the turbine blade shell 9 or 15 is formed by reshaping the cylindrical or tapered blank removed from the mandrel, the pore spaces are arranged substantially normal to the surface of the porous wall blank or are of labyrinth in nature.

If it is desired to provide a turbine blade wherein the passages are acute to the surface and directed downstream, the porous wall blank is formed on a mandrel of larger size than the turbine blade periphery. After removal, the porous wall blank is flattened, cut to form two pieces defining opposite sides of the turbine blade then welded or otherwise bonded along the leading and trailing edges, as indicated by 19 and 20 in FIGURE 2, the passages in the two pieces being first oriented in the desired direction.

It should be observed that although the invention is particularly applicable to the construction of turbine blades, it is also applicable to the construction of other aerodynamic bodies.

Having thus described certain embodiments and applications of my invention, I do not desire to be limited thereto, but intend to claim all novelty inherent in the appended claims.

I claim:

1. A hollow turbine blade, comprising: a porous wall having a turbine blade profile, said wall having opposed faces and comprising a multiplicity of laminations of parallel, continuously spaced wound flattened wires, wires of adjacent laminations being in angular relation so as to cross at spaced cross points with their flat surfaces abutting the flat surfaces of the wires of said adjacent laminations and being bonded together at said cross points, the spaces between wires in each of the internal laminations forming channels parallel to but between the opposed faces of said wall and the intersections of said channels forming ports extending between and through the faces of said porous wall.

2. A turbine blade, as set forth in claim 1 wherein: said wires are wound so that said ports are continuous from one face to the other of said wall.

3. A turbine blade, as set forth in claim 1 wherein: the wires of certain laminations are offset with respect to the wires of other laminations whereby said ports are discontinuous and series-connected with said channels to form labyrinth passages all communicating between the faces of said wall.

4. A turbine blade, as set forth in claim 1 wherein: said porous wall is seamless.

5. A turbine blade, as set forth in claim 1 wherein: said porous wall includes two sections joined together at the leading and trailing edges of said turbine blade.

6. A turbine blade, as set forth in claim 1 wherein: said porous wall includes two sections joined together at the leading and trailing edges of said turbine blade, and said pore spaces slope outwardly and toward the trailing edges of said turbine blade.

7. A turbine blade, as set forth in claim 1 wherein: a strut is contained within and bonded to said porous wall at intermittent locations for supporting said porous wall, said strut defining within said wall flow ducts between said bonded locations.

References Cited in the file of this patent

UNITED STATES PATENTS

| | | |
|---|---|---|
| 1,829,179 | Back | Oct. 27, 1931 |
| 2,189,785 | Fahrney | Feb. 13, 1940 |
| 2,489,683 | Stalker | Nov. 29, 1949 |
| 2,577,336 | Lampton | Dec. 4, 1951 |
| 2,648,520 | Schmitt | Aug. 11, 1953 |
| 2,665,881 | Smith | Jan. 12, 1954 |
| 2,699,598 | Daugherty | Jan. 18, 1955 |
| 2,843,355 | Findley | July 15, 1958 |

OTHER REFERENCES

Publication: N.A.C.A. Research Memorandum, RME51H23, "Wire Cloth as Porous Material for Transpiration-Cooled Walls," by E. R. G. Eckert, Martin R. Kinsler, November 13, 1951 (38 pages).